US012808708B2

(12) United States Patent
Barchilon et al.

(10) Patent No.: US 12,808,708 B2
(45) Date of Patent: Nov. 24, 2026

(54) INSECT DOSING SYSTEM AND METHOD

(71) Applicant: FREEZEM CRYOGENICS LTD., Herzelia (IL)

(72) Inventors: Nati Barchilon, Rehovot (IL); Idan Alyagor, Rehovot (IL)

(73) Assignee: FREEZEM CRYOGENICS LTD., Herzelia (IL)

( * ) Notice: Subject to any disclaimer, the term of this patent is extended or adjusted under 35 U.S.C. 154(b) by 266 days.

(21) Appl. No.: 18/861,465

(22) PCT Filed: May 14, 2023

(86) PCT No.: PCT/IL2023/050495
§ 371 (c)(1),
(2) Date: Oct. 29, 2024

(87) PCT Pub. No.: WO2023/223313
PCT Pub. Date: Nov. 23, 2023

(65) Prior Publication Data
US 2025/0283752 A1 Sep. 11, 2025

(30) Foreign Application Priority Data
May 15, 2022 (IL) .......................................... 293023

(51) Int. Cl.
*G01G 19/42* (2006.01)
*B65B 1/32* (2006.01)
*G01G 23/01* (2006.01)
*G06T 7/00* (2017.01)

(52) U.S. Cl.
CPC ............... *G01G 19/42* (2013.01); *B65B 1/32* (2013.01); *G01G 23/01* (2013.01); *G06T 7/0008* (2013.01); *G06T 2207/30242* (2013.01)

(58) Field of Classification Search
CPC ........ A01K 67/366; A23K 10/20; B65B 1/32; G01G 17/00; G01G 19/42; G01G 23/01; G06V 10/50; G06V 10/751; G06V 20/60; G06T 7/0008; G06T 2207/30242
USPC ...................................................... 177/25.17
See application file for complete search history.

(56) References Cited

U.S. PATENT DOCUMENTS

| | | | | |
|---|---|---|---|---|
| 4,139,070 A * | 2/1979 | Hanson | G01G 19/42 177/25.17 |
| 4,157,738 A * | 6/1979 | Nishiguchi | G07D 5/04 177/25.17 |
| 4,447,885 A * | 5/1984 | Biss | G06M 9/00 177/25.17 |
| 8,530,763 B2 * | 9/2013 | Bradley | G01G 19/42 177/25.17 |
| 2011/0036644 A1 * | 2/2011 | Razzaghi | G01G 17/00 177/25.17 |
| 2013/0144431 A1 | 6/2013 | Tidhar et al. | |
| 2016/0232656 A1 | 8/2016 | Taylor et al. | |

(Continued)

OTHER PUBLICATIONS

PCT International Search Report for International Application No. PCT/IL2023/050495, mailed Jul. 25, 2023, 3pp.

(Continued)

*Primary Examiner* — Randy W Gibson
(74) *Attorney, Agent, or Firm* — The Roy Gross Law Firm, LLC; Roy D. Gross

(57) ABSTRACT

An insect dosing system constituted of: at least one scale; an imager; a calibration functionality; and a dose functionality.

20 Claims, 10 Drawing Sheets

(56) References Cited

U.S. PATENT DOCUMENTS

| | | | |
|---|---|---|---|
| 2020/0345039 | A1 | 11/2020 | Zha et al. |
| 2021/0022325 | A1 | 1/2021 | Greeley et al. |

OTHER PUBLICATIONS

PCT Written Opinion for International Application No. PCT/IL2023/050495, mailed Jul. 25, 2023, 4pp.

* cited by examiner

INSECT DOSING SYSTEM AND METHOD

CROSS REFERENCE TO RELATED APPLICATIONS

This application is a National Phase of PCT Patent Application No. PCT/IL2023/050495 having International filing date of May 14, 2023, which claims the benefit of priority of Israeli Patent Application No. 293023, filed May 15, 2022, the contents of which are all incorporated herein by reference in their entirety.

TECHNICAL FIELD

The present disclosure relates to the field of insect farming, and in particular to a system and method of insect dosing.

BACKGROUND

Insects can be utilized for various applications such as pest management, protein and oil production for the food and animal feed industries, production of materials for the pharmaceutical and cosmetic industries, waste reduction, production of fertilizers for agriculture, and more.

One way of providing insects to clients is to ship them in the neonate stage. When a shipment of insect neonates is ordered, a specific number of neonates are ordered, and the number of shipped neonates should be as close as possible to the ordered number. In addition, larvae are typically reared in batches, and the number of larvae in each batch greatly impacts their performance. However, counting neonates, which are extremely small, variable in size, and tend to cluster, can be challenging. In addition, the presence of debris from the eggshell, growth medium or other sources, adds more noise to the system. Thus, applying "traditional" and off the shelf solutions for neonates counting or weight dosing is not sufficient and may lead to large errors in the range of dozens of percentages. Additionally, prior art solutions that attempt to increase dosing accuracy are typically very slow, and thus not economically efficient. This is true not only for neonates, but also for other insects with similar characteristics, i.e. very small, large variations in size for different samples and a tendency to aggregate.

SUMMARY

Accordingly, it is a principal object of the present invention to overcome at least some of the disadvantages of prior art insect dosing systems.

This is provided in one embodiment by an insect dosing system comprising: at least one scale; an imager; a calibration functionality; and a dose functionality, wherein the calibration functionality: receives from the scale a measurement of a weight of a calibration group of insects; receives from the imager at least one image of the calibration group of insects; responsive to the received at least one image, determines the number of insects in the calibration group; and responsive to the determined number of insects in the calibration group and the received weight measurement, determine a calibration function, and wherein the dose functionality: receives from the at least one scale a measurement of a weight of a product group of insects; and responsive to the received measurement of the weight of the product group and the determined calibration function, outputs a signal indicative of the number of insects in the product group.

In some examples, the insect dosing system further comprises: a container; and a dispenser providing a path from the container to the scale, wherein the dose functionality: applies the determined calibration function to the received measurement of the weight of the product group to determine the number of insects in the product group; compares the determined number of insects in the product group to a predetermined dosing value; and controls the dispenser to add insects from the container to the at least one scale until the determined number of the product group of insects reaches the predetermined dosing value.

In some examples, the insect dosing system further comprises: a container; and a dispenser providing a path from the container to the scale, wherein the dose functionality: applies the determined calibration function to a predetermined dosing value to determine a target weight; compares the received measurement of the weight of the product group to the determined target weight; and controls the dispenser to add insects from the container to the at least one scale until the determined target weight is reached.

In some examples, the dispenser comprises a vibration conveyor, the vibration conveyer controlled by the dose functionality.

In some examples, a surface of the vibration conveyor is coated with a hydrophobic or hydrophilic material.

In some examples, the insect dosing system further comprises a dead insect filter that filters out dead insects.

In some examples, the dead insect filter comprises a sieve. In some examples, an average diameter of holes of the sieve is 250-300 microns.

In some examples, the dead insect filter comprises a platform.

In some examples, the insect dosing system further comprises: a plate; and a vertical translation mechanism, the vertical translation mechanism translating the plate between a first position and a second position, wherein in the first position the plate rests on the at least one scale and in the second position the plate is vertically displaced from the at least one scale.

In some examples, the at least one image comprises a plurality of images take at predetermined time intervals.

In some examples, the predetermined time intervals are offset from each other by 1-15 seconds.

In some examples, the calibration functionality determines the number of the calibration group of insects by: determining, for each of the plurality of images, a histogram of object areas within the respective image; determining, for one or more of the plurality of images, a threshold value responsive to a maximum value of the respective histogram; selecting one of the plurality of images, the selected image containing the lowest percentage of objects whose areas are each greater than the determined threshold value, wherein the number of the calibration group of insects is determined from the selected image.

In some examples, the number of the calibration group of insects is determined by counting the number of objects whose areas are each less the determined threshold value.

In some examples, the calibration functionality further compares corresponding pixels of the plurality of images to each other, and defines a pixel as containing a dead neonate when the corresponding pixel in all of the plurality of images exhibit the same value.

In some examples, the calibration functionality determines the calibration function a plurality of times during a day.

In some examples, the calibration functionality, while in operation, determines the calibration function every 30-90 minutes.

In some examples, the insect dosing system further comprises: at least one processor; and at least one memory containing instructions thereon, wherein when read by the processor, the instructions of the at least one memory cause the at least one processor to implement the calibration functionality and the dose functionality.

In some examples, the insect dosing system further comprises: a calibration unit; and a dosing unit, wherein the at least one scale comprises two scales, wherein the calibration unit comprises the imager, a first of the two scales and the calibration functionality, and wherein the dosing unit comprises a second of the two scales and the dose functionality.

In some examples, the calibration group of insects and product group of insects comprise insect larvae.

In some examples, the calibration group of insects and product group of insects comprise insect neonates.

Independently, an insect dosing method is provided, the method comprising: receiving from at least one scale a measurement of a weight of a calibration group of insects; receiving from an imager at least one image of the calibration group of insects; responsive to the received at least one image, determining the number of insects in the calibration group; responsive to the determined number of insects in the calibration group and the received weight measurement, determining a calibration function; receiving from the at least one scale a measurement of a weight of a product group of insects; and responsive to the received measurement of the weight of the product group and the determined calibration function, outputting a signal indicative of the number of insects in the product group.

In some examples, the method further comprises: applying the determined calibration function to the received measurement of the weight of the product group to determine the number of insects in the product group; comparing the determined number of insects in the product group to a predetermined dosing value; and controlling a dispenser to add insects from a container to the at least one scale until the determined number of the product group of insects reaches the predetermined dosing value.

In some examples, the method further comprises: applying the determined calibration function to a predetermined dosing value to determine a target weight; comparing the received measurement of the weight of the product group to the determined target weight; and controlling a dispenser to add insects from a container to the at least one scale until the determined target weight is reached.

In some examples, the dispenser comprises a vibration conveyor.

In some examples, a surface of the vibration conveyor is coated with a hydrophobic material.

In some examples, the method further comprises filtering the calibration group of insects through a dead insect filter to filter out dead insects.

In some examples, the dead insect filter comprises a sieve. In some examples, an average diameter of holes of the sieve is 250-300 microns.

In some examples, the dead insect filter comprises a platform.

In some examples, the method further comprises: translating a plate between a first position and a second position, wherein in the first position the plate rests on the at least one scale and in the second position the plate is vertically displaced from the at least one scale.

In some examples, the at least one image comprises a plurality of images take at predetermined time intervals.

In some examples, the predetermined time intervals are offset from each other by 1-15 seconds.

In some examples, the determination of the number of the calibration group of insects comprises: determining, for each of the plurality of images, a histogram of object areas within the respective image; determining, for one or more of the plurality of images, a threshold value responsive to a maximum value of the respective histogram; selecting one of the plurality of images, the selected image containing the lowest percentage of objects whose areas are each greater than the determined threshold value, and wherein the number of the calibration group of insects is determined from the selected image.

In some examples, the number of the calibration group of insects is determined by counting the number of objects whose areas are each less the determined threshold value.

In some examples, the method further comprises: comparing corresponding pixels of the plurality of images to each other; and defining a pixel as containing a dead neonate when the corresponding pixel in all of the plurality of images exhibit the same value.

In some examples, the calibration function is determined a plurality of times during a day. In some examples, the calibration function is determined every 30-90 minutes.

In some examples, the calibration group of insects and product group of insects comprise insect larvae.

In some examples, the calibration group of insects and product group of insects comprise insect neonates.

Additional features and advantages of the invention will become apparent from the following drawings and description.

Unless otherwise defined, all technical and scientific terms used herein have the same meaning as commonly understood by one of ordinary skill in the art to which this invention pertains. In case of conflict, the patent specification, including definitions, governs. As used herein, the articles "a" and "an" mean "at least one" or "one or more" unless the context clearly dictates otherwise. As utilized herein, "and/or" means any one or more of the items in the list joined by "and/or". As an example, "x and/or y" means any element of the three-element set {(x), (y), (x, y)}. In other words, "x and/or y" means "x, y or both of x and y". As another example, "x, y, and/or z" means any element of the seven-element set {(x), (y), (z), (x, y), (x, z), (y, z), (x, y, z)}.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

As used herein, the term "about", when referring to a measurable value such as an amount, a temporal duration, and the like, is meant to encompass variations of +/−10%, more preferably +/−5%, even more preferably +/−1%, and still more preferably +/−0.1% from the specified value, as such variations are appropriate to perform the disclosed devices and/or methods.

The following embodiments and aspects thereof are described and illustrated in conjunction with systems, tools and methods which are meant to be exemplary and illustrative, but not limiting in scope. In various embodiments, one or more of the above-described problems have been reduced or eliminated, while other embodiments are directed to other advantages or improvements.

BRIEF DESCRIPTION OF DRAWINGS

For a better understanding of the invention and to show how the same may be carried into effect, reference will now be made, purely by way of example, to the accompanying drawings in which like numerals designate corresponding sections or elements throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how several forms of the invention may be embodied in practice. In the accompanying drawings.

DETAILED DESCRIPTION OF CERTAIN EMBODIMENTS

Figure 1A:
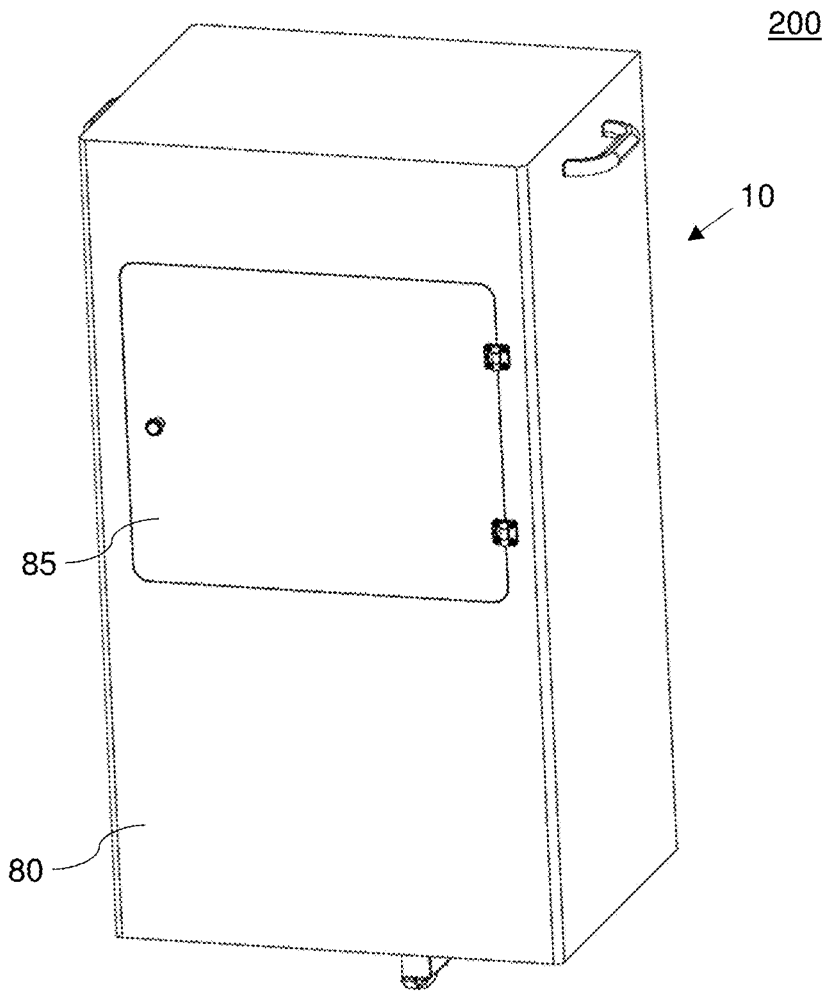
FIGS. 1A-1F illustrate various high-level views of a calibration unit, in accordance with some examples.

In the following description, various aspects of the disclosure will be described. For the purpose of explanation, specific configurations and details are set forth in order to provide a thorough understanding of the different aspects of the disclosure. However, it will also be apparent to one skilled in the art that the disclosure may be practiced without specific details being presented herein. Furthermore, well-known features may be omitted or simplified in order not to obscure the disclosure. In the figures, like reference numerals refer to like parts throughout. In order to avoid undue clutter from having too many reference numbers and lead lines on a particular drawing, some components will be introduced via one or more drawings and not explicitly identified in every subsequent drawing that contains that component.

Figure 1B:
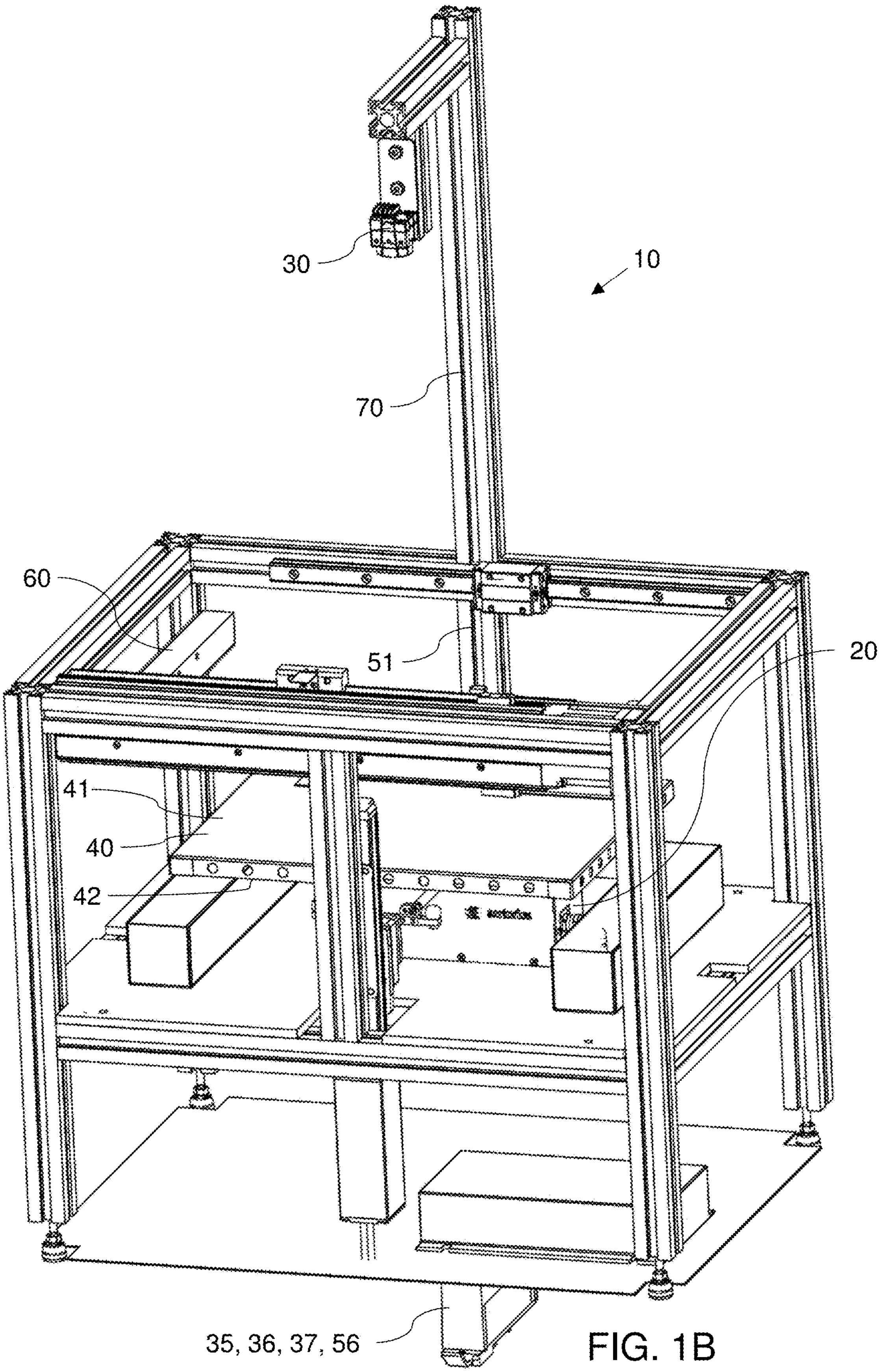
Figure 1C:
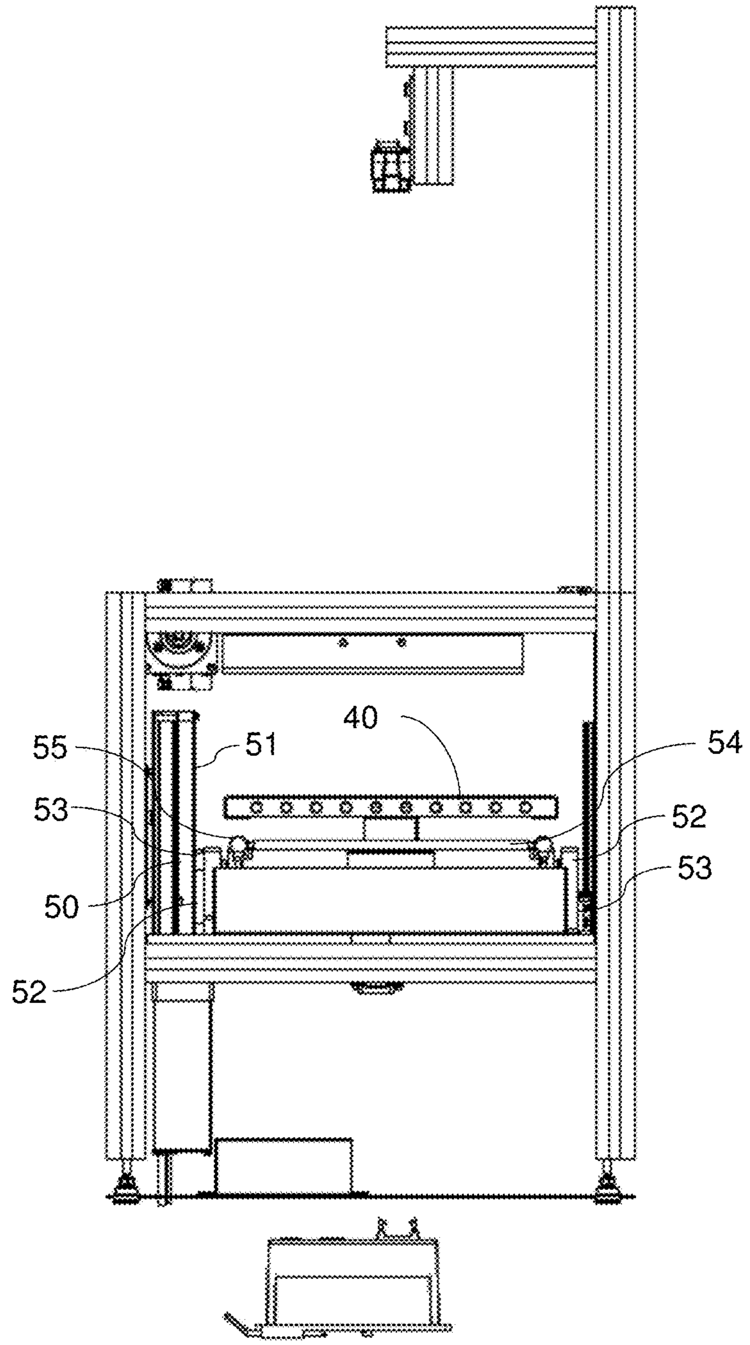
Figure 1D:
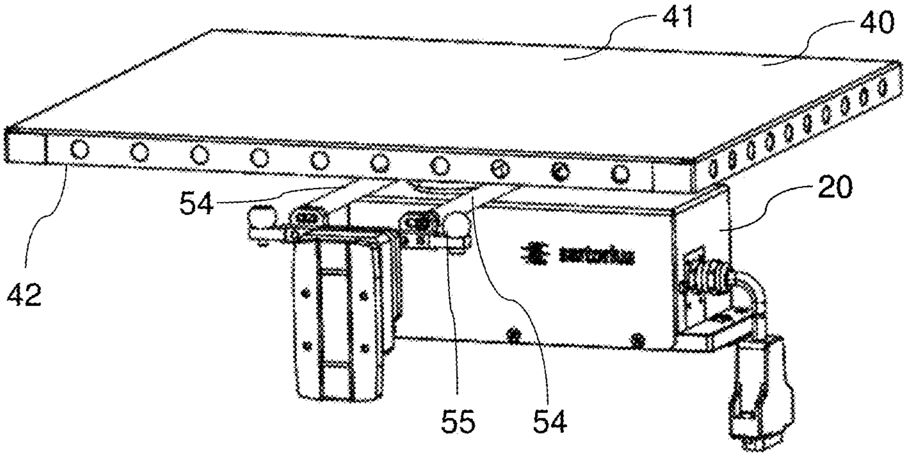
Figure 1E:
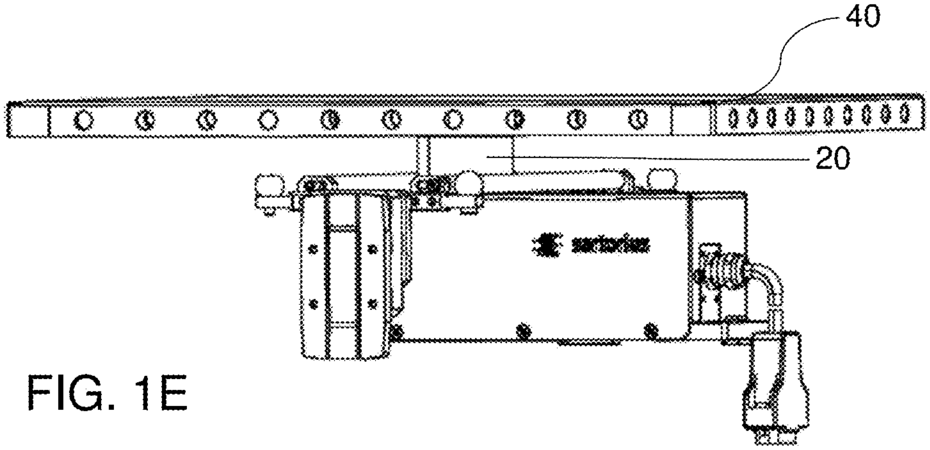

FIG. 1A illustrates a high-level perspective view of a calibration unit 10, in accordance with some examples; FIG. 1B illustrates a high-level perspective view of various parts of calibration unit 10, in accordance with some examples; FIG. 1C illustrates a high-level side view of the various parts of calibration unit 10 of FIG. 1B, in accordance with some examples; FIG. 1D illustrates a high-level perspective view of various parts of calibration unit 10, in accordance with some examples; and FIG. 1E illustrates a high-level side view of the various parts of calibration unit 10 of FIG. 1D, in accordance with some examples.

In some examples, calibration unit 10 comprises: a scale 20; an imager 30; and a calibration functionality 35. In another example, calibration unit 10 further comprises: a plate 40 exhibiting an upper face 41 and a lower face 42; and a vertical translation mechanism 50. In another example, calibration unit 10 further comprises a cleaning mechanism 60. In another example, calibration unit 10 further comprises: an arm 70. In another example, calibration unit 10 further comprises: a housing 80 optionally comprising a door 85. In some examples, housing 80 contains therewithin scale 20, imager 30, plate 40, vertical translation mechanism 50, cleaning mechanism 60 and arm 70.

The term "scale", as used herein, is meant to include any device that determines the weight of one or more objects. The term "imager", as used herein, is meant to include any device that generates images, such as a camera.

In some examples, calibration functionality 35 is implemented as computer implemented instructions stored on a memory 36 and read by a processor 37. The computer implemented instructions cause processor 37 to perform the functions of calibration functionality 35 described below. In some examples, memory 36 comprises any of: read-only memory (ROM), such as programmable ROM (PROM), erasable PROM (EPROM), electrically erasable PROM (EEPROM); or random-access memory (RAM), such as static RAM (SRAM) and dynamic RAM (DRAM). In some examples, processor 37 is part of a computer.

Although calibration functionality 35, memory 36 and processor 37 are illustrated as being situated within housing 80, this is not meant to be limiting in any way. In some examples, calibration functionality 35, memory 36 and/or processor 37 are located in an external computer system.

Plate 40 is illustrated as being rectangular-shaped, however this is not meant to be limiting in any way. In some examples, upper face 41 of plate 40 is black. In another example, upper face 41 of plate 40 exhibits a matte surface, optionally black. In another example, plate 40 is an aluminum plate, optionally anodized aluminum. Imager 30 faces upper face 41 of plate 40 and is in some examples secured to an end of arm 70. In some examples, the dimensions of plate 40 and the lens diameter of imager 30 are defined such that the field of view of imager 30 covers at least the entirety of upper face 41 of plate 40. In another example the plate is electrically discharged.

The term "vertical translation mechanism" is meant to include any device that generates vertical movement. In some examples, vertical translation mechanism 50 comprises: one or more vertically oriented support members 51 shaped as a rail or a slit; one or more sliding members 52 each secured within a respective support member 51; and one or more vertical actuators 53 optionally each comprising a motor, each vertical actuator 53 secured to a respective sliding member 52. In some examples, translation members 52 are movable away from plate 40, as illustrated. Particularly, in such an example, translation members 52 comprise one or more members 55, members 55 shaped and dimensioned to securely fit within respective sockets of plate 40. Translation members 54 are each in some examples a bar, tube or any suitably shaped member secured between sliding members 52. In some examples, vertical translation mechanism 50 comprises a control circuitry 56.

In some examples, control circuitry 56 comprises one, or a combination, of: a microcontroller; a field-programmable gate array (FPGA); a computer; or any suitable circuitry.

In some examples (not shown), cleaning mechanism 60 comprises: a pressurized air tank and a pressurized air valve; a motor rotating a fan to create suction; a linear actuator that linearly translates a wiping member; or a combination thereof. Arm 70 is illustrated as being L-shaped, however this is not meant to be limiting in any way.

In operation, plate 40 is positioned over scale 20 such that lower surface 42 is in contact with scale 20. In some examples, vertical translation mechanism 50 vertically translates plate 40 between: a first position, away from scale 20; and a second position, where lower surface 42 is in contact with scale 20. In some examples, control circuitry 56 controls the one or more vertical actuators 53 to vertically translate translation members 54 plate 40 such that plate 40 is translated vertically between the first and second position. As illustrated, in some examples, after bringing plate 40 to the second position on scale 20 vertical actuators 53 further translate translation members 54 downwards, away from plate 40, by pulling members 55 out of sockets 43. Although calibration unit 10 is described herein in relation to vertical translation mechanism 50, this is not meant to be limiting in any way and calibration unit 10 can be provided without any vertical translation of plate 40.

A calibration group of insects is dispersed on upper face 41 of plate 40. The term "calibration group" merely means a group of insects currently being used in calibration unit 10 to perform calibration, as will be described below, and is not meant to be limiting in any way.

Figure 1F:
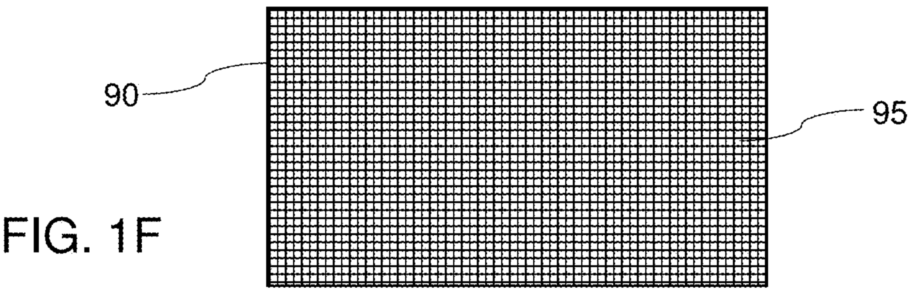

In some examples, calibration unit 10 further comprises a dead insect filter. The dead insect filter filters out dead insects. In some examples, as illustrated in FIG. 1F, the dead insect filter comprises a sieve 90. In some examples, sieve 90 exhibits holes 91 with a diameter of about 250-300 microns. In such an example, the calibration group is filtered via sieve 90. Using sieve 90 advantageously filters out egg shells. Additionally, the diameter of holes 91 is such that the insects don't typically fall through and the insects need to crawl through holes 91, thus most of the insects passing through sieve 90 are live insects.

In another example (not shown), the dead insect filter comprises a platform. The term "platform", as used herein, means a generally flat and level surface where at least part of the edge of the platform is open such that insects can advance over the edge. In such an example, the live insects will crawl off the platform and the dead insects will remain thereon, thereby allowing the live insects to be weighed and imaged without the dead insects.

When plate 40 is positioned on scale 20, scale 20 outputs a measurement of a weight of the calibration group of insects, the measurement being received by calibration functionality 35. In some examples, the output of scale 20 is predefined in relation to the weight of plate 40 such that the output measurement equals the weight of the calibration group of insects. In another example, the output of scale 20 comprises the sum of the weight of the calibration group and the weight of plate 40. In such an example, calibration functionality 35 subtracts the known weight of plate 40 from the received measurement to obtain the weight of the calibration group of insects.

Imager 30 is controlled to take one or more images of upper face 41 of plate 40 and outputs the one or more images to calibration functionality 35. In some examples, imager 30 takes a plurality of images, at predetermined time intervals. In some examples, the predetermined time intervals are offset from each other by 1-15 seconds. In some examples, the images are taken at 8-12 time intervals. In some examples, imager 30 is controlled by control circuitry 56 to take the images. In another example (not shown), a dedicated control circuitry is provided for imager 30.

Responsive to the received weight measurement and the received one or more images, calibration functionality 35 determines a calibration function. In some examples, the calibration function is determined by: determining the number of insects in the calibration group responsive to the received one or more images; and defining the relationship between the number of insects of the calibration group and the total weight of the calibration group. In some examples, the calibration function CF is:

$$CF = 1/(W/N) \qquad \text{EQ. 1}$$

where W is the measured weight of the calibration group and N is the determined number of insects in the calibration group.

In some examples, prior to identifying objects in each image, inconsistencies in the illumination of upper face 41 of plate 40 are corrected by calibration functionality 35. In one further example, a morphological opening is performed on the image to remove all insects from the image, thereby leaving a background image. The term "background image", as used herein, means an image containing primarily the background, without objects. The background image is then subtracted from the original image, thereby correcting the lighting.

In some examples, objects are identified in the image by calibration functionality 35 using Otsu's method for binarization and then filling in the segments using morphological reconstruction. In some examples, any segments smaller than a predetermined size are removed from consideration, since they are too small to be insects. In some examples, for insect insects, the predetermined size is about $0.05*1\ mm^2$.

In some examples, calibration functionality 35 determines, for each image, a histogram of object areas within the respective image. In some examples, calibration functionality further determines, for each image, a threshold value responsive to a maximum value of the respective histogram. Particularly, for each image, the maximum value in the histogram (which is the most common area value) should represent the typical size of a insect within the calibration group. A threshold value is then determined responsive to the histogram maximum value. Objects with areas greater than the threshold value represent clumps of insects, and therefore calibration functionality 35 identifies the percentage of objects in the image which represent clumps by counting the number of objects exhibiting a size greater than the determined threshold value and comparing it to the total number of objects. In some examples, the threshold value is determined separately for each image. In another example, the threshold value is determined in a subset of the images. In some examples, the threshold value is defined such that an object is identified as a cluster if:

$$\text{round}(A_{obj}/H_{max}) > 1 \qquad \text{EQ. 2}$$

where 'round' is a rounding function, $A_{obj}$ is the area of the object and $H_{max}$ is the histogram maximum value.

In some examples, calibration functionality 35 then selects the image containing the lowest percentage of objects whose areas are each greater than the threshold value. Thus, the selected image contains the least amount of insect clumps, thereby providing a more accurate calculation of the insect weight, as will be described below. In some examples, the weight of the calibration group of insects is also received at calibration functionality 35 at each time interval and the weight used to determine the calibration function is the weight measured at the respective time interval of the selected image. In another example, the weight of the calibration group is only measured once.

In some examples, calibration functionality 35 compares the pixels and/or objects of the plurality of images to each other and defines a pixel and/or object as containing a dead insect when the corresponding pixel and/or object in all of the plurality of images exhibits the same value. For example, if the pixel with the coordinate (100, 100) in each of the binarized images equals 1, this is an indication that the pixel represents part of a dead insect (since it hasn't moved over the plurality of time intervals) and calibration functionality 35 removes the object containing that pixel from consideration, optionally by deleting the object from the image or subtracting the object when counting the insects. In another example, in order to determine the presence of a dead insect, a plurality of adjacent pixels, or a whole object is identified as being in the same coordinates in each of the images.

In some examples, calibration functionality 35 counts the number of insects on plate 40 by counting the number of objects whose area is less than the determined threshold value described above. As described above, the number of insects are counted only in the selected one of the plurality of images.

In another example, calibration functionality 35 comprises a neural network trained to identify live insects. In such an example, calibration functionality 35 counts the number of identified live insects and determines a calibration function, as described above.

In some examples, the determined calibration function is output to a user display. In another example, the determined calibration function is output to a dose functionality, as will be described below.

In some examples, after weighing and imaging the calibration group, cleaning mechanism 60 is used to clean the insects off plate 40. In some examples, cleaning mechanism 60 cleans off plate 40 using any, or a combination, of: pressurized air; suction; and a wiping member linearly translated across upper face 41 of plate 40 to wipe off any insects. In some examples, vertical translation mechanism 50 vertically translates plate 40 to the height of cleaning mechanism 60 for cleaning. In some examples, control circuitry 56 controls vertical actuators 53 to slide sliding members 52 along support members 51 to thereby vertically translate plate 40, as described above.

Advantageously, housing 80, and door 85, allow weighing and imaging to be performed, without the effect of any air currents which may move the insects dispersed on plate 40 and/or effect the measurements of scale 20.

In some examples, calibration functionality 35 determines the calibration function a plurality of times during a day. Particularly, a plurality of times a day a calibration group of insects is dispersed on plate 40, and weight and imaging measurements are received, as described above. Due to changes in humidity, the water weight of the insects can change during the course of the day, therefore determining the calibration function frequently will keep it up to date. Additionally, the weight of the insects can change due to energy expenditure and due to adhesive secretion. In some examples, calibration functionality 35 determines the calibration function every 30-90 minutes over a predetermined portion of the day.

Figure 2A:
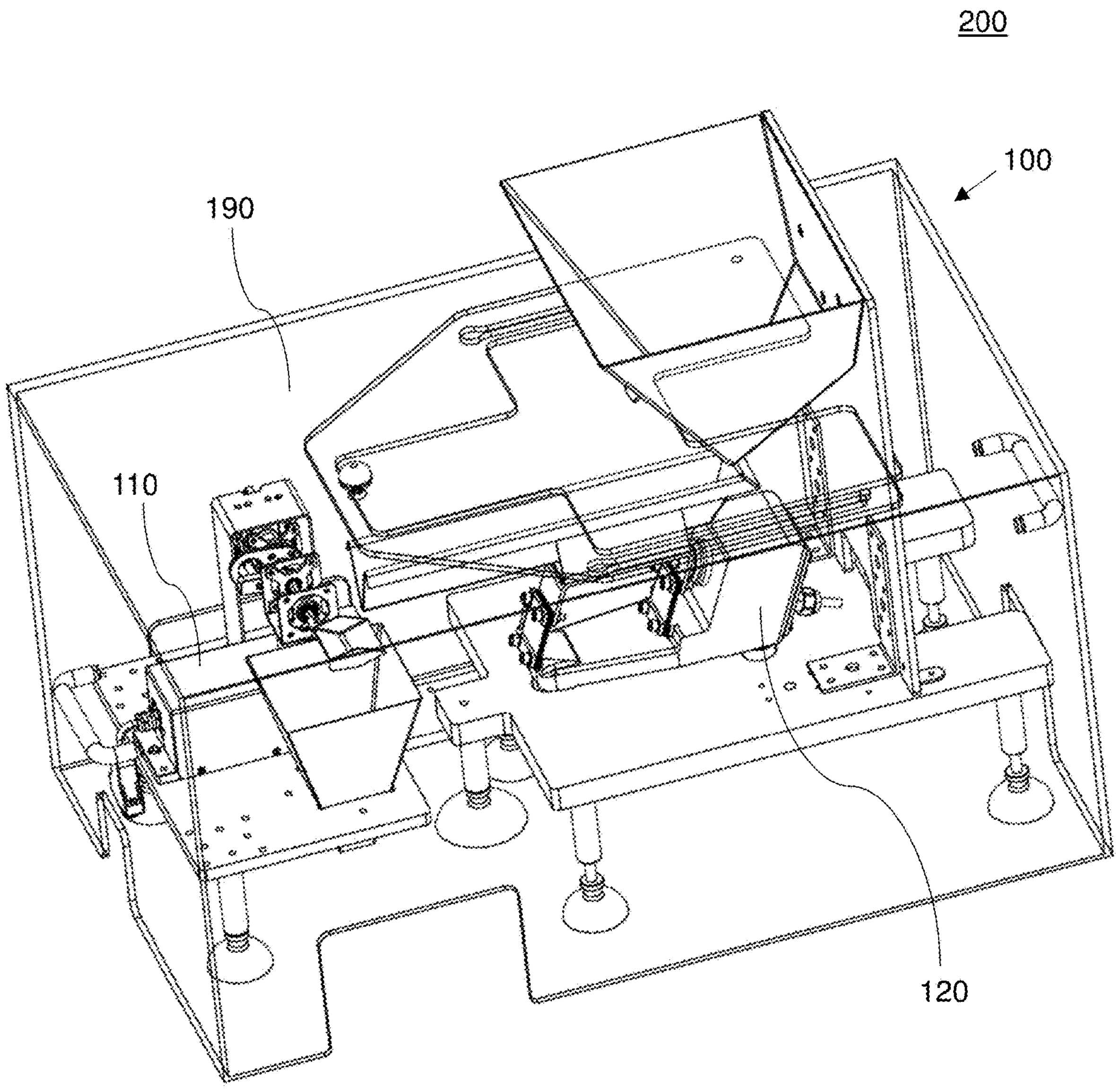
FIGS. 2A-2D illustrate various high-level views of a dosing unit, in accordance with some examples.
Figure 2B:
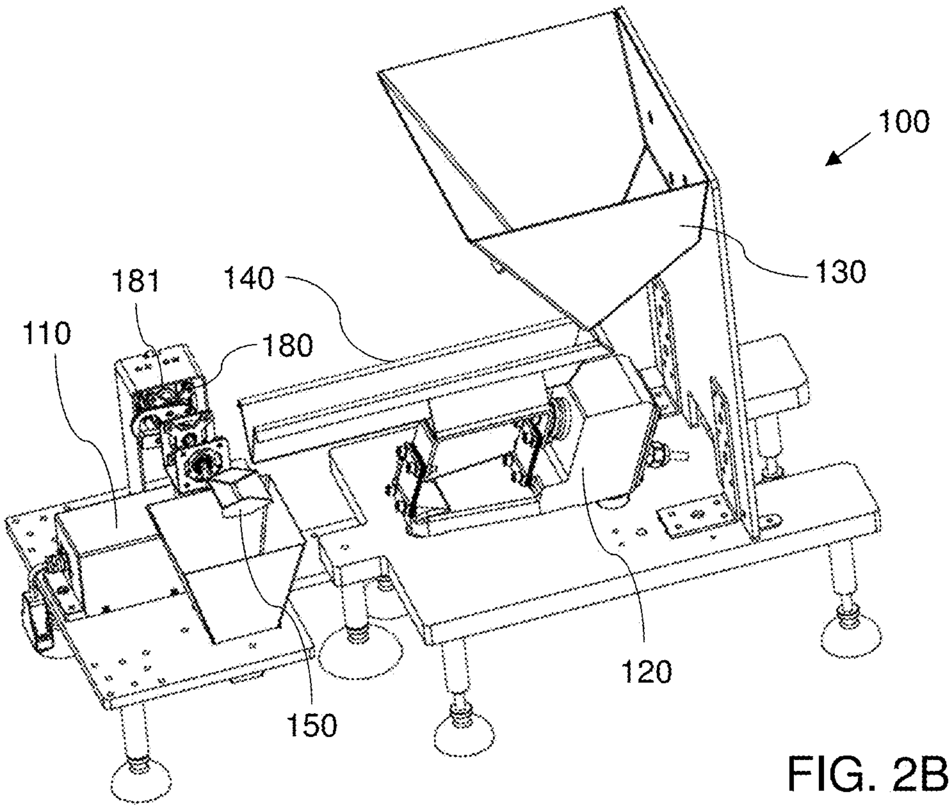
Figure 2C:
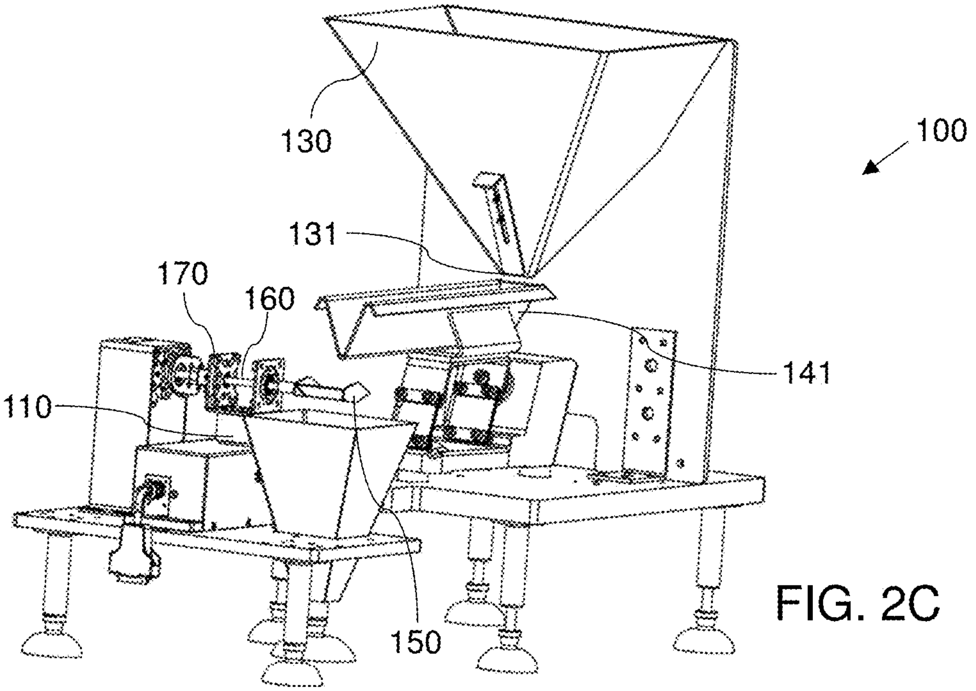
Figure 2D:
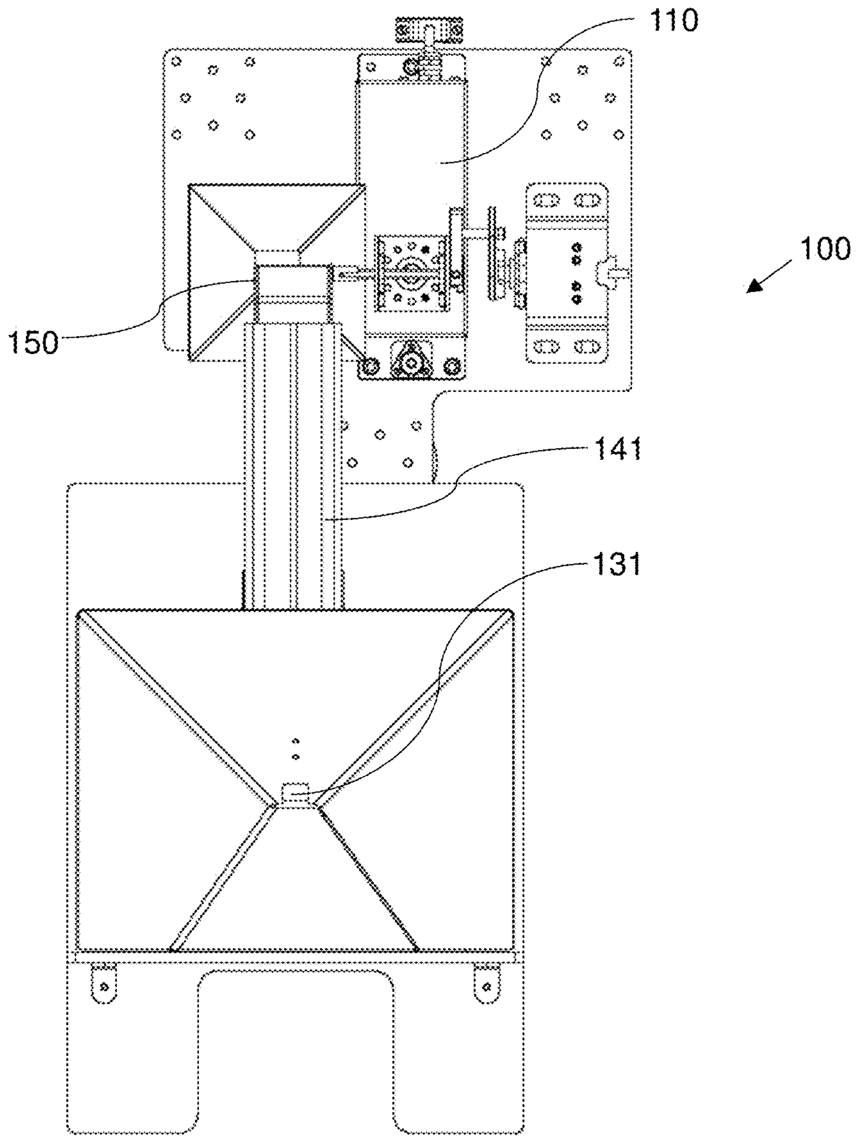

FIG. 2A illustrates a high-level, partially transparent, perspective view of a dosing unit 100, in accordance with some examples; FIG. 2B illustrates a first high-level perspective view of various parts of dosing unit 100, in accordance with some examples; FIG. 2C illustrates a second high-level perspective view of the various parts of dosing unit 100 of FIG. 2B; and FIG. 2D illustrates a high-level top view of the various parts of dosing unit 100 of FIG. 2B.

In some examples, dosing unit 100 comprises: a scale 110; and a dose functionality 120. In some examples, dose functionality 120 is implemented as a control circuitry, such as a proportional-integral-derivative (PID) controller.

In another example, as described above in relation to calibration functionality 35, dose functionality 120 is implemented as computer implemented instructions stored on a memory 36 and read by a processor 37. The computer implemented instructions cause processor 37 to perform the functions of dose functionality 120 described below. In some examples, dosing unit 100 and calibration unit 10 each comprise a respective memory 36 and processor 37. In another example, a single memory 36 and/or processor 37 are provided for both dosing unit 100 and calibration unit 10, with dose functionality 120 and calibration functionality 35 are each implemented as respective computer implemented instructions.

In some examples, dosing unit 100 comprises: a container 130 exhibiting an opening 131; and a dispenser 140. In some examples, dosing unit 100 comprises a dose accumulation member 150. In some examples, dosing unit 100 comprises: a connection member 160; a weight member 170; and a rotation actuator 180 comprising a motor 181. A first end of connection member 160 is secured to dose accumulation member 150, a second end of connection member 160 is secured to rotation actuator 180 and a portion of connection member 160 is secured to weight member 170. Weight member 170 is positioned on scale 110. In some examples, connection member 160 is a bar, tube, or any appropriate shaped object. In some examples weight member 170 is generally rectangular shaped, with at least 3 sides, such that connection member 160 extends through 2 parallel sides and a third side rests on scale 110.

In some examples, dosing unit 100 further comprises a housing 190, housing 190 containing scale 110, dose functionality 120, container 130, dispenser 140, dose accumulation member 150, connection member 160, weight member 170 and rotation actuator 180.

Dispenser 140 provides a path from opening 131 of container 130 to dose accumulation member 150, and thus in consequence to scale 110. In some examples, dispenser 140 comprises a vibration conveyer 141, a first end of vibration conveyer 141 juxtaposed with opening 131 of container 130 and a second end of vibration conveyer 141 juxtaposed with accumulation member 150. In some examples, a face 143 of vibration conveyer 141 is coated with a hydrophobic material (such as hydrophobic silica). In some examples, the hydrophobic material is a super hydrophobic material. In another example, face 143 of vibration conveyer 141 is coated with a hydrophilic material (such as silicon dioxide). In some examples, the hydrophilic material is a super hydrophilic material. The term "vibration conveyer", as used herein, is a trough or tube flexibly supported and vibrated by mechanical or electrical means to convey objects or bulk materials, as known to those skilled in the art. The term "hydrophobic" describes the segregation of water and hydrophobic substances, which maximizes hydrogen bonding between molecules of water and minimizes the area of contact between water and hydrophobic molecules. The term "hydrophobicity" can also be defined as the wettability of the surface. Particularly, a surface with a lower hydrophobicity exhibits a higher wettability than a surface with a higher hydrophobicity. Similarly, the terms "hydrophilic" and "hydrophilicity" describe the affinity of water towards hydrophilic substances. In some examples, any portions of dispenser 140, dose accumulation member 150 and/or container 130 are coated with a hydrophilic or hydrophobic material.

In some examples, scale 110 is in communication with an input of dose functionality 120 and an output of dose functionality 120 is in communication with a motor of vibration conveyer 141, such that dose functionality controls the current magnitude of vibration conveyer 141.

In operation, dose functionality 120 receives the calibration function, determined by calibration functionality 35, as described above. In some examples, dose functionality 120 is in communication with calibration functionality 35, and dose functionality 120 receives the determined calibration function from calibration functionality 35. In another example, dose functionality 120 comprises a user input terminal (such as a touch screen or keyboard) and calibration functionality 35 comprises a user output terminal (such as a screen), such that a user can read the calibration function from calibration functionality 35 and input the calibration functionality at the user input terminal of dose functionality 120.

A dosing value, containing the desired dosage of insects is input into dose functionality 120, via the user input terminal. The dosing value is defined as the number of desired insects. A product group of insects are weighed on scale 110, optionally on accumulation member 150, and dose functionality 120 receives from scale 110 a measurement of a weight of the product group. The term "product group" merely means a group of insects currently being used in dosing unit 100, and is not meant to be limiting in any way. Particularly, the terms "product group" and "calibration group" are used herein merely to avoid confusion.

Scale 110 outputs a measurement of a weight of the product group of insects, the measurement being received by dose functionality 120. In some examples, the output of scale 110 is predefined in relation to the weight of accumulation member 150, connection member 160 and weight member 170 such that the output measurement equals the weight of the product group of insects. In another example, the output of scale 20 comprises the sum of the weight of the calibration group and the weight of accumulation member 150, connection member 160 and weight member 170. In such an example, dose functionality 120 subtracts the known weight of accumulation member 150, connection member 160 and weight member 170 from the received measurement to obtain the weight of the product group of insects.

In some examples, dose functionality 120 determines the number of insects in the product group (i.e. the number of insects being weighed by scale 110) by applying the calibration function to the received measurement of scale 110. Responsive to an outcome of the applied calibration function, dose functionality 120 outputs a signal indicative of the number of insects in the product group. Particularly, in such an example, the determined number of insects is compared to the dosing value. In the event that the determined number of insects is less than the dosing value, dose functionality 120 outputs a signal indicating that more insects are required for the product group. In some examples, such a signal controls vibration conveyer to continue and/or increase the vibration thereof to add more insects to the product group, until the determined number of insects is equal to the dosing value. In another example, the output signal controls a user display to indicate to a user that more insects are needed.

In another example, dose functionality 120 applies the calibration function to the dosing value to determine the target weight of the product group. In some examples, dose functionality compares the received weight measurement from scale 110 to the target weight and outputs a signal indicative of the number of insects in the product group. Particularly, in such an example, the signal is indicative of the number of insects since it is indicative whether the target weight has been reached, the target weight being a function of the dosing value (which is a number of insects). In the event that the received weight measurement is less than the target weight, dose functionality 120 outputs a signal indicating that more insects are required for the product group. In some examples, such a signal controls vibration conveyer 141 to continue and/or increase the vibration thereof to add more insects from container 130 to the product group, until the received weight measurement is equal to the target weight. In another example, the output signal controls a user display to indicate to a user that more insects are needed.

In some examples, once the target weight, or the dosing value is reached, dose functionality 120 controls vibration conveyer 141 to stop providing more insects. In some examples, motor 181 of rotation actuator 180 rotates accumulation member 150 to thereby pour the dose of insects into a receptacle. In another example (not shown), a dosing receptacle is placed on scale 110 and the insects are poured therein. In such an example, when the target weight, or dosing value, is reached the dosing receptacle is removed and a new one is placed on scale 110 for the next dose.

Thus, in some examples, an insect dosing system 200 is provided, insect dosing system 200 comprising calibration unit 10 and dosing unit 100. Although insect dosing system 200 is illustrated and described as having separate scales 20 and 110, this is not meant to be limiting in any way. In another example, a single scale is provided, used both for measuring the weight of the calibration group of insects and for measuring the weight of the product group of insects.

Although the above has been described in relation to insect dosing system 200, this is not meant to be limiting in any way. In another example (not shown for simplicity), imaging the calibration group of insects is not performed on a plate resting on a scale, rather on a plate that is in a different location. For example, the calibration group of insects can be weighed within a receptacle that is placed on a scale, and then the calibration group of insects are poured out on a plate, or other surface, to be imaged.

In another example (not shown for simplicity), the calibration group of insects is imaged while being transported on a linear feeder conveyor to a receptacle that is placed on a scale. The imaging can be performed on the conveyer itself and/or while the insects are falling into the receptacle.

An experiment was performed to analyze the change in weight of insects over the course of a day. The experiment was performed by:

1. Placing a batch of 90 mg of insects within an incubator at 25 degrees C;
2. Placing a batch of 90 mg insects within a room with an unknown ambient temperature;
3. For each batch of insects, at intervals of 2 hours, determining the number of insects and the weight thereof, as described above; and
4. At each time point, determining a calibration number, denoted CN, which is defined as the number of insects per milligram of weight.

The experiment was repeated 3 times, over 3 different days.

Figure 3A:
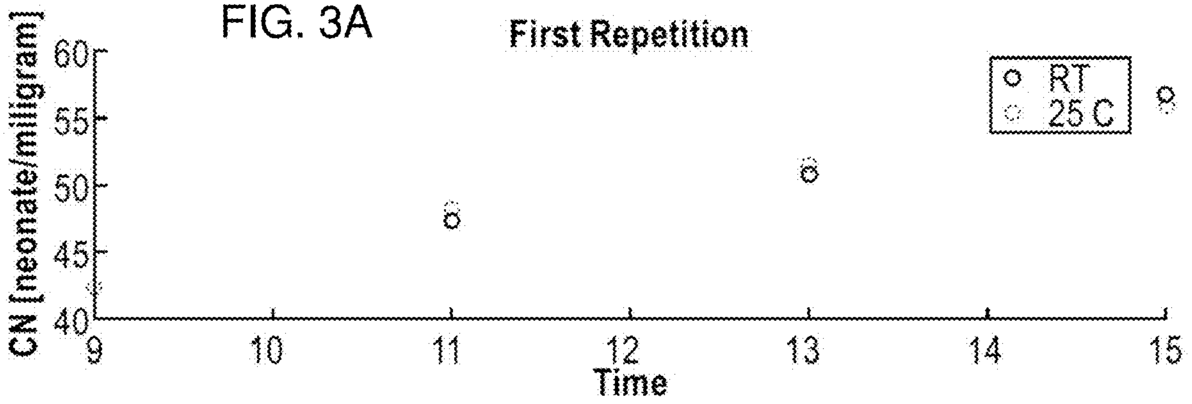
FIGS. 3A-3E illustrate various graphs of an experiment showing the change in weight of insect neonates over time and the variation in the calibration number in different temperatures and repeats.
Figure 3B:
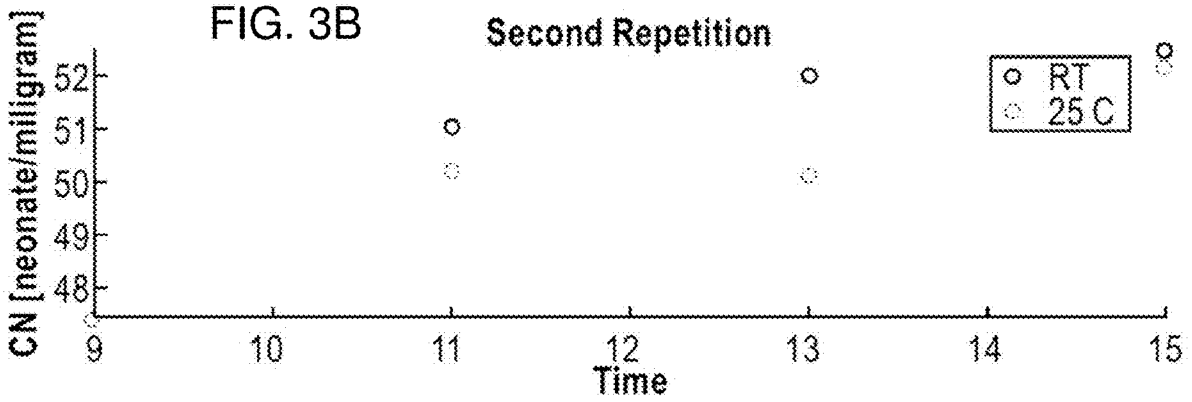
Figure 3C:
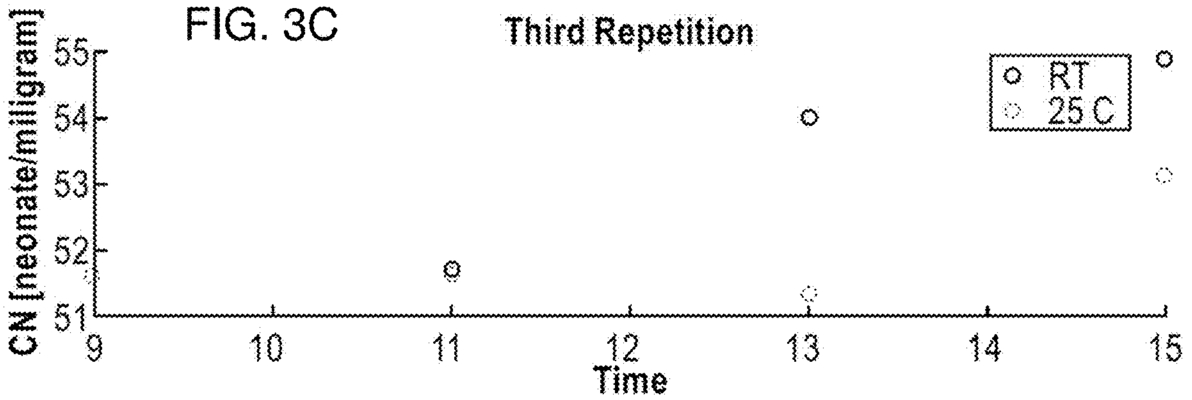

FIGS. 3A-3C each illustrate a graph of the results of the experiment for a respective day, where the x-axis represents the time of day and the y-axis represents the determined calibration number. For each graph, the calibration numbers of the batch at room temperature, denoted RT, are shown with solid circles, and the calibration numbers of the batch in the incubator, denoted 25C, as shown dashed circles.

Figure 3D:
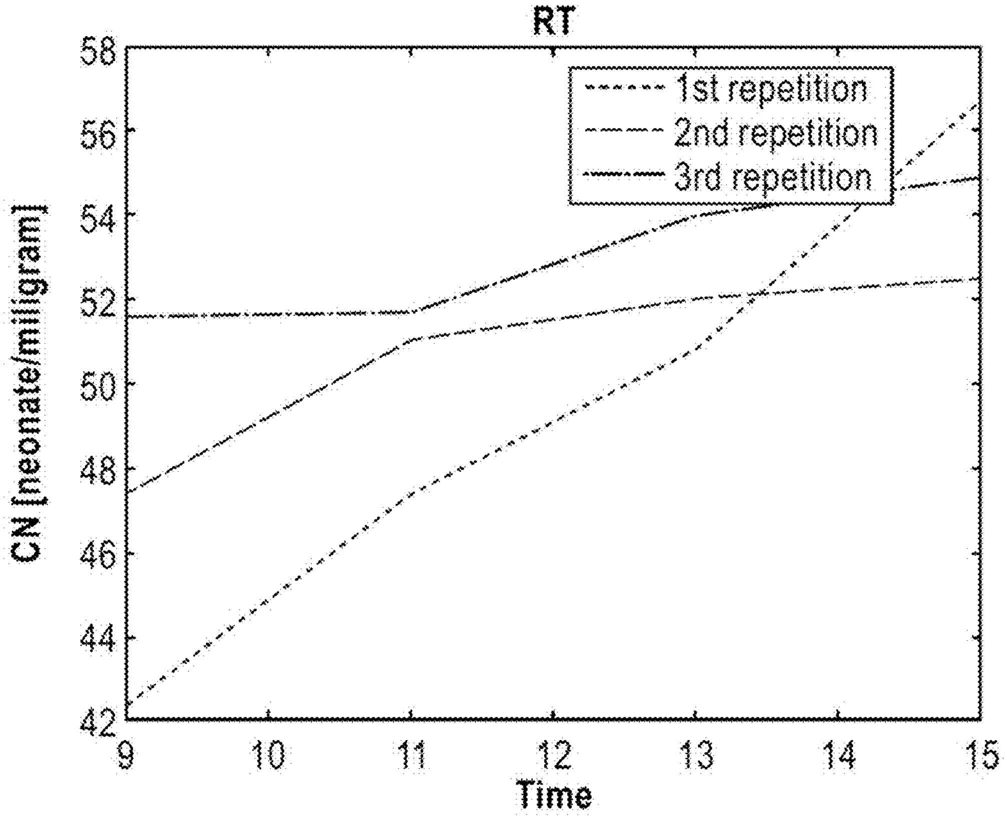
Figure 3E:
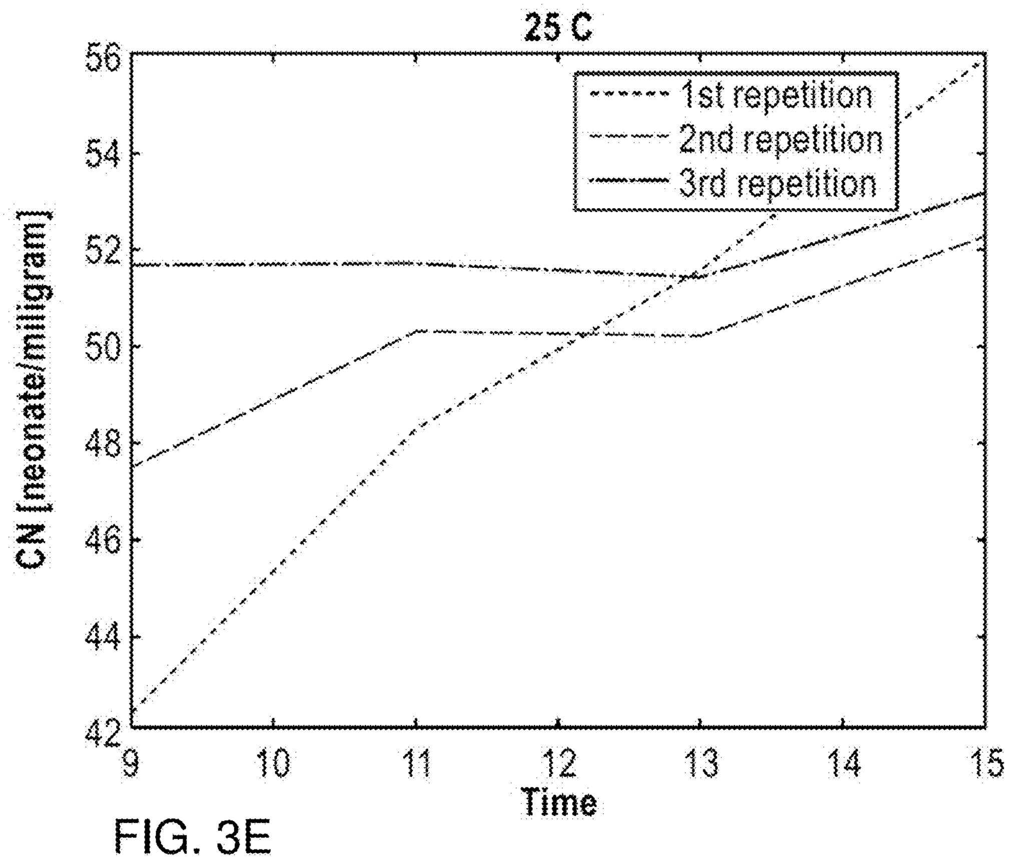

FIG. 3D illustrates a plot of the results of the room temperature experiment and FIG. 3E illustrates a plot of the results of the incubator experiment. For each plot, the x-axis represents the time of day and the y-axis represents the determined calibration number. For each plot, the results of the first repetition of the experiment are shown by a short-dashed line, the results of the second repetition of the experiment are shown by a long-dashed line and the results of the third repetition of the experiment are shown by a dash-dot line.

As shown in FIGS. 3A-3E, as time goes by since hatching of the insects the calibration number increases due to the decrease in weight of the insects. As can be seen from the graph, as time goes by since hatching calibration number gets higher. It is noted that the calibration number can also decrease over time due to condensation.

The plots of FIGS. 3D-3E show that there is a similarity in the rate of change of the calibration number even though they were placed in different environments. Different ambient temperatures seems to have an effect on the calibration number due to evaporation.

However, the incubated samples show that although the ambient temperature was the same, the rate of change was not constant, therefore it is assumed that there are other factors that affect the weight of the insects.

Figure 4:
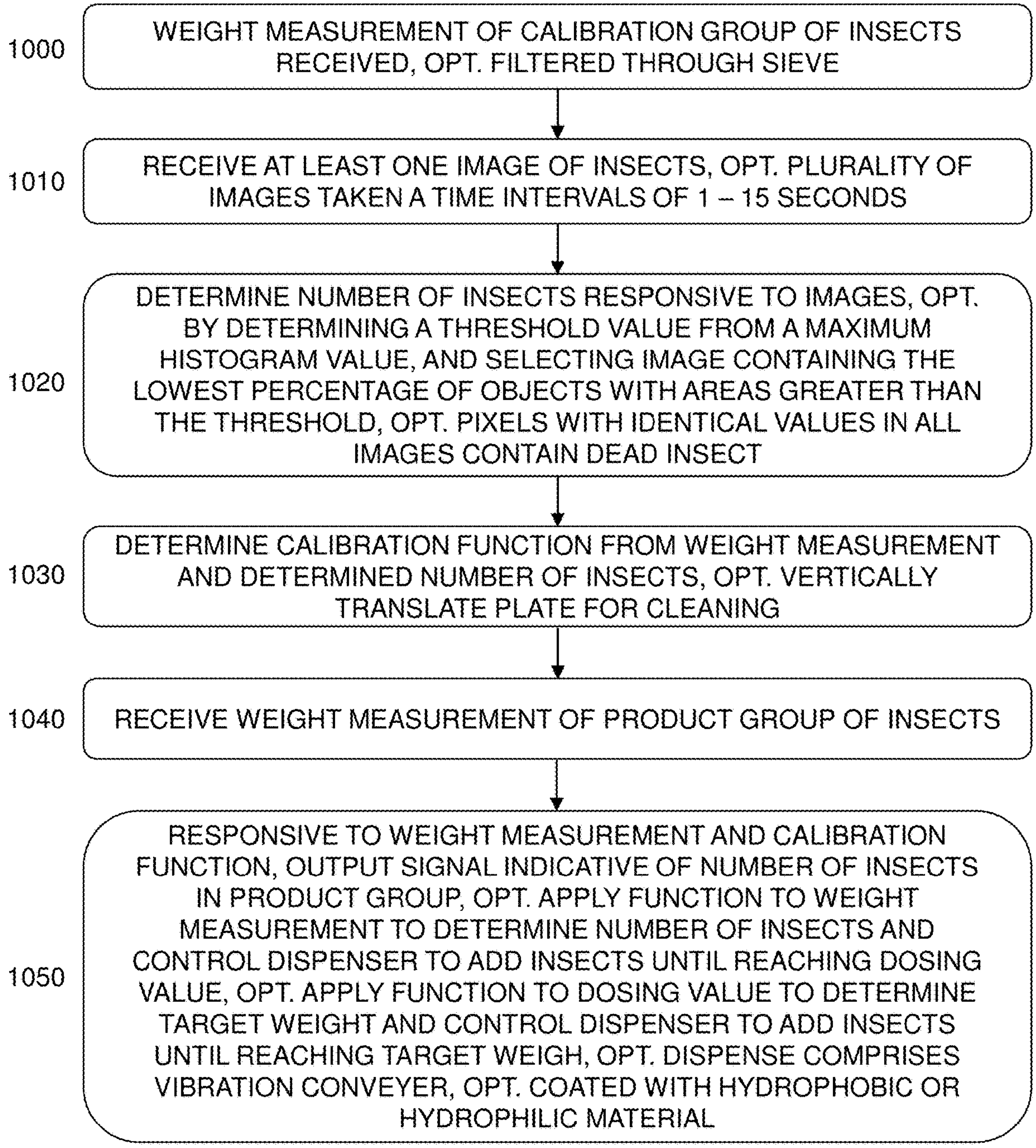
FIG. 4 illustrates a high-level flow chart of an insect dosing method, in accordance with some examples.

FIG. 4 illustrates a high-level flow chart of an insect dosing method, in according with some examples. In stage 1000, a measurement of a weight of a calibration group of insects is received from at least one scale. In some examples, the measurement of the weight of the calibration group of insects is received form the a first of two scales. In some examples, the calibration group of insects are filtered through a sieve, wherein an average diameter of holes of the sieve is 250-300 microns.

In stage 1010, at least one image of the calibration group of insects of stage 1000 is received from an imager. In some examples, the at least one image comprises a plurality of images take at predetermined time intervals. In one further example, the predetermined time intervals are offset from each other by 8-12 seconds.

In stage 1020, responsive to the received at least one image of stage 1010, the number of insects in the calibration group is determined. In some examples, as described above, the determination of the number of the calibration group of insects comprises: determining, for each of the plurality of images, a histogram of object areas within the respective image; determining, for one or more of the plurality of images, a threshold value responsive to a maximum value of the respective histogram; selecting one of the plurality of images, the selected image containing the lowest percentage of objects whose areas are each greater than the determined threshold value, and wherein the number of the calibration group of insects is determined from the selected image. In some examples, the number of the calibration group of insects is determined by counting the number of objects whose areas are each less the determined threshold value.

In some examples, corresponding pixels of the plurality of images are compared to each other and a pixel is defined as containing a dead insect when the corresponding pixel in all of the plurality of images exhibit the same value. Such dead insects are not counted as part of the number of the calibration group of insects.

In some examples, each insect is identified and a tracking algorithm is applied across the plurality of images for each identified insect. The tracking algorithm determines the speed of the insect, for example by determining the change in position of the identified insect within the image as a function of time. In some examples, the speed of the insect is compared to a respective threshold value, and if the speed is less than the threshold value the insect is considered unhealthy and is not counter as part of the number of the calibration group of insect.

In some examples, it is determined how many insects there are in each clump of insects, and/or the average number of insects within each clump of insects. In some examples, a respective algorithm is applied to determine the speed at which the clump of insects disperse over time, for example by comparing the sizes of the clumps between the plurality of images. Particularly, the insects tend to initially clump together and then disperse. However, if the insects are not healthy they will disperse at a lower rate. In some examples, the determined dispersal rate is output at a user display. In some examples, the rate of dispersal is determined and compared to a respective threshold value. If the rate of dispersal is less than the threshold value, an indication that the insects are unhealthy is output at the user display.

In stage 1030, responsive to the determined number of insects in the calibration group of stage 1020 and the received weight measurement of stage 1000, a calibration function is determined. In some examples, the calibration function is determined a plurality of times during a day. In some examples, the calibration function is determined every 30-90 minutes.

In some examples, following the determination of the calibration function, a plate having the calibration group of insects dispersed thereon is translated between a first position and a second position. In the first position the plate rests on the at least one scale and in the second position the plate is vertically displaced from the at least one scale.

In stage 1040, a measurement of a weight of a product group of insects is received from the at least one scale. In some examples, the measurement is received from a second scale, different than the scale of stage 1000.

In stage 1050, responsive to the received measurement of the weight of the product group of stage 1040, and the determined calibration function of stage 1030, a signal indicative of the number of insects in the product group is output.

In stage 1060, the determined calibration function is applied to the received measurement of the weight of the product group to determine the number of insects in the product group. The determined number of insects in the product group is compared to a predetermined dosing value. A dispenser is controlled to add insects from a container to the at least one scale until the determined number of the product group of insects reaches the predetermined dosing value. In some examples, the dispenser comprises a vibration conveyor. In another example, a surface of the vibration conveyor is coated with a hydrophobic material.

In stage 1070, the determined calibration function is applied to a predetermined dosing value to determine a target weight, the predetermined dosing value being a number of desired insects. The received measurement of the weight of the product group is compared to the determined target weight. A dispenser is controlled to add insects from a container to the at least one scale until the determined target weight is reached. In some examples, the dispenser comprises a vibration conveyor. In another example, a surface of the vibration conveyor is coated with a hydrophobic material.

In some examples, the calibration group of insects and product group of insects comprise insect larvae. In one further example, the calibration group of insects and product group of insects comprise insect neonates. However, this is not meant to be limiting in any way, and any group of insects can be dosed with the above system and method.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description.

The invention claimed is:

1. An insect dosing system comprising:

at least one scale;

an imager;

a calibration functionality; and a dose functionality;

wherein the calibration functionality:

receives from the scale a measurement of a weight of a calibration group of insects;

receives from the imager at least one image of the calibration group of insects;

responsive to the received at least one image, determines the number of insects in the calibration group; and responsive to the determined number of insects in the calibration group and the received weight measurement, determine a calibration function, and wherein the dose functionality:

receives from the at least one scale a measurement of a weight of a product group of insects; and responsive to the received measurement of the weight of the product group and the determined calibration function, outputs a signal indicative of the number of insects in the product group.

2. The insect dosing system of claim 1, further comprising:

a container; and a dispenser providing a path from the container to the scale, wherein the dose functionality:

applies the determined calibration function to the received measurement of the weight of the product group to determine the number of insects in the product group;

compares the determined number of insects in the product group to a predetermined dosing value; and controls the dispenser to add insects from the container to the at least one scale until the determined number of the product group of insects reaches the predetermined dosing value.

3. The insect dosing system of claim 1, further comprising:

a container; and a dispenser providing a path from the container to the scale, wherein the dose functionality:

applies the determined calibration function to a predetermined dosing value to determine a target weight;

compares the received measurement of the weight of the product group to the determined target weight; and controls the dispenser to add insects from the container to the at least one scale until the determined target weight is reached.

4. The insect dosing system of claim 1, further comprising:

a plate; and a vertical translation mechanism, the vertical translation mechanism translating the plate between a first position and a second position, wherein in the first position the plate rests on the at least one scale and in the second position the plate is vertically displaced from the at least one scale.

5. The insect dosing system of claim 1, wherein the at least one image comprises a plurality of images take at predetermined time intervals.

6. The insect dosing system of claim 5, wherein the calibration functionality determines the number of the calibration group of insects by:

determining, for each of the plurality of images, a histogram of object areas within the respective image;

determining, for one or more of the plurality of images, a threshold value responsive to a maximum value of the respective histogram;

selecting one of the plurality of images, the selected image containing the lowest percentage of objects whose areas are each greater than the determined threshold value, wherein the number of the calibration group of insects is determined from the selected image.

7. The insect dosing system of claim 6, wherein the number of the calibration group of insects is determined by counting the number of objects whose areas are each less the determined threshold value.

8. The insect dosing system of claim 6, wherein the calibration functionality further compares corresponding pixels of the plurality of images to each other, and defines a pixel as containing a dead neonate when the corresponding pixel in all of the plurality of images exhibit the same value.

9. The insect dosing system of claim 1, wherein the calibration functionality determines the calibration function a plurality of times during a day.

10. An insect dosing method, the method comprising:

receiving from at least one scale a measurement of a weight of a calibration group of insects;

receiving from an imager at least one image of the calibration group of insects;

responsive to the received at least one image, determining the number of insects in the calibration group;

responsive to the determined number of insects in the calibration group and the received weight measurement, determining a calibration function;

receiving from the at least one scale a measurement of a weight of a product group of insects; and responsive to the received measurement of the weight of the product group and the determined calibration function, outputting a signal indicative of the number of insects in the product group.

11. The insect dosing method of claim 10, further comprising:

applying the determined calibration function to the received measurement of the weight of the product group to determine the number of insects in the product group;

comparing the determined number of insects in the product group to a predetermined dosing value; and controlling a dispenser to add insects from a container to the at least one scale until the determined number of the product group of insects reaches the predetermined dosing value.

12. The insect dosing method of claim 10, further comprising:

applying the determined calibration function to a predetermined dosing value to determine a target weight;

comparing the received measurement of the weight of the product group to the determined target weight; and controlling a dispenser to add insects from a container to the at least one scale until the determined target weight is reached.

13. The insect dosing method of claim 10, further comprising:

translating a plate between a first position and a second position, wherein in the first position the plate rests on the at least one scale and in the second position the plate is vertically displaced from the at least one scale.

14. The insect dosing method of claim 10, wherein the at least one image comprises a plurality of images take at predetermined time intervals.

15. The insect dosing method of claim 14, wherein the determination of the number of the calibration group of insects comprises:

determining, for each of the plurality of images, a histogram of object areas within the respective image;

determining, for one or more of the plurality of images, a threshold value responsive to a maximum value of the respective histogram;

selecting one of the plurality of images, the selected image containing the lowest percentage of objects whose areas are each greater than the determined threshold value, and wherein the number of the calibration group of insects is determined from the selected image.

16. The insect dosing method of claim 15, wherein the number of the calibration group of insects is determined by counting the number of objects whose areas are each less than the determined threshold value.

17. The insect dosing method of claim 15, further comprising:

comparing corresponding pixels of the plurality of images to each other; and defining a pixel as containing a dead neonate when the corresponding pixel in all of the plurality of images exhibit the same value.

18. The insect dosing method of claim 10, wherein the calibration function is determined a plurality of times during a day.

19. The insect dosing method of claim 10, wherein the calibration group of insects and product group of insects comprise insect larvae.

20. The insect dosing method of claim 19, wherein the calibration group of insects and product group of insects comprise insect neonates.

* * * * *